Figure 1:
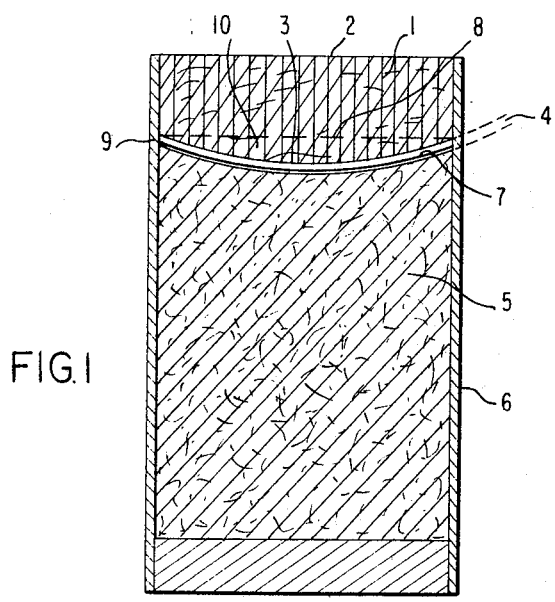

Nov. 14, 1967    H. DILCHERT    3,352,243

SOLID FUEL PROPELLANT CHARGE

Filed July 14, 1965

INVENTOR

HEINZ DILCHERT

BY Dicke + Craig

ATTORNEYS

United States Patent Office 3,352,243
Patented Nov. 14, 1967

3,352,243
SOLID FUEL PROPELLANT CHARGE
Heinz Dilchert, Steyerberg, Germany, assignor to Dynamit Nobel Aktiengesellschaft, Troisdorf, Germany
Filed July 14, 1965, Ser. No. 471,828
15 Claims. (Cl. 102—101)

The present invention relates to a solid fuel propellant charge arrangement for rockets, and more particularly to a solid fuel, end-burner type propellant charge for rockets.

It is known with rockets to equip the engines with combined starting normal operating propulsion units, i.e., duel propulsion units, of solid fuel in which a starting stage produces for purposes of achieving the required flight velocity a short-lasting high thrust and in which after burn-out of the starting stage, a normal-operation stage with a smaller but longer lasting thrust output then maintains the flight velociy of the rocket during a more or less large portion of the flight duration at a substantially constant value. By reason of the required long burning time of the normal operating stage, the latter is thereby constructed as end burner while the starting stage also constructed as end burner is usually arranged ahead of the operating stage.

With a desired or required thrust ratio of from example 1.5:1 between starting and normal operating stages, these two stages may be made of an integral powdered block with the use of conventional known solid fuels and may be burned by way of a common nozzle. If, however, a higher thrust ratio of, for example, 4:1 is aimed at, then this can no longer be achieved with a unitary powder block made of a single solid fuel and by a common nozzle common to both stages since no solid fuel is known which exhibits such a large output ratio within its own characteristic jamming range.

It has now been discovered that with end-burner dual propulsion units of solid fuel, large thrust ratios and the use of a common nozzle for both stages may be realized if one bonds or glues two blocks of propellant fuel having differently large burning characteristics to one another along the end faces thereof and takes the necessary measures that during burning, the glueing or bonding surfaces are not reached simultaneously in all places so that during transition from the start to the normal operating stage neither an excessively abrupt burning pressure drop nor an ignition interruption occurs, and that finally also a diffusion of component parts of the one fuel into the other fuel is made impossible, for example, to render impossible with the use of two fuel blocks of nitroglycerine powder the diffusion of nitroglycerine and softeners or plasticizers.

Accordingly, the present invention proposes to bond, cement or glue to one another along the end faces thereof in a diffusion impervious manner two blocks made of propellant fuel having different rapid burning characteristics in a surface or layer of rotational symmetry whose configuration, as viewed in the direction of the axial dimensions of the propellant charge, is different from that of the free end surface constructed in an axially symmetrical manner of the one block forming the starting stage so that the burning transition from one block to the other block stretches over a predetermined more or less long period of time, for example, over a duration of 0.2 to 0.4 second. Appropriately, the connecting surface between the two blocks is constructed as spherical or otherwise nonplanar surface and the free end surface of the block forming the starting stage has a plane surface or vice versa.

By a construction of the bonding surface deviating more or less strongly from a plane surface one is readily in a position to influence in the desired manner the burning transition from the start to the normal operating stage and therewith also the course of the burning pressure and to achieve in particular that the starting stage only burns out when the normal operating stage has begun to burn to sufficiently large degree. By the axially symmetrical construction of the bonding surface, there is additionally achieved that the burning operation takes place at all times completely axially symmetrically.

It is further proposed in an appropriate further development of the present invention to make the two propellant fuel blocks of a powder with identical base composition but with different types of burning accelerators whereby a diffusion-impervious or diffusion-tight bonding of the two blocks exists automatically and inherently as with blocks so constructed a diffusion does not occur to start with, so that no special measures are necessary as regards thereto. Similarly as with the manufacture of the two propellant fuel blocks of powder of different base composition, it may also be of advantage in connection with two blocks of the same base composition to make use of the measure provided in accordance with a further proposal of the present invention to connect the two blocks by the interposition of a diffusion-preventing impervious foil.

Accordingly, it is an object of the present invention to provide a solid fuel end burner propulsion charge for rockets which obviates by simple means the aforementioned drawbacks and shortcomings encountered with the prior art constructions.

Another object of the present invention resides in the provision of a solid fuel rocket which permits a relatively large thrust ratio between starting and normal operating thrusts while permitting the use of a common nozzle for the starting and normal operating charges.

A further object of the present invention resides in the provision of a solid fuel propulsion unit in which an ignition interruption and/or an excessively abrupt burning pressure drop is avoided.

A still further object of the present invention resides in the provision of a solid fuel rocket propellant charge in which the diffusion between the material of the starting block and of the normal operating block is far-reachingly prevented.

Still another object of the present invention resides in the provision of a solid fuel end burner propellant charge for rockets which achieves all of the aforementioned aims and objects in a simple manner yet causes a burning at all times in a completely axially symmetrical manner.

Figure 2:
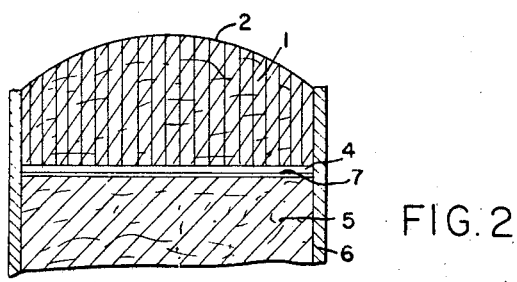

These and other objects, features, and advantages of the present invention will become more obvious from the following description when taken in connection with the accompanying drawing which shows, in the single figure thereof, for purposes of illustration only, one embodiment in accordance with the present invention and wherein:

FIGURE 1 is an axial cross-sectional view through a solid-fuel end-burner-type propellant charge for rockets in accordance with the present invention; and FIGURE 2 is another embodiment of the present invention using the same numerals as in FIGURE 1 for substantially the same elements.

Referring now to the single figure of the drawing, the starting stage 1 made of any known and appropriate relatively rapidly burning solid fuel and having a burning surface 2 is bonded, cemented, or glued by means of its spherically shaped end surface 3 by way of the bonding layer 4 having an inserted impervious foil 7 with the correspondingly formed end surface of the normal operating stage 5 made of any known and appropriate slowly burning solid fuel. Both stages 1 and 5 are covered externally with a common insulation 6 for safeguarding against burning.

The burning takes place from the surface 2 and reaches at the time of the end of the burning of the starting stage 1 the plane 8 indicated in dash line. Whereas the spherically shaped portion 10 of the starting stage 1 continues to burn, the ignition of the normal operating stage 5 has already been initiated along the rim 9 of the spherically shaped end surface of the normal operating stage 5 whereby both an ignition or burning interruption as well as an excessively abrupt burning pressure drop are avoided as might occur otherwise if the bonding layer 4 were disposed in the plane 8. Since the impervious foil 7 remains between the as yet not burning fuel particles of both stages 1 and 5 until the complete burn-out of the starter stage 1, a diffusion of the component parts of the one fuel into the other fuel is avoided with certainty, which could also be achieved, of course, without foil 7, for example, by the use of a corresponding bonding, cementing or gluing material.

Corresponding conditions are also produced if instead of a spherical bonding surface or layer, any other bonding surface or layer is provided which is not axially symmetrical.

The blocks 1 and 5 may be made of any conventional solid propellant fuels having the desired characteristics, for example, using suitable mixtures of nitroglycerine and nitrocellulose with the addition of conventional known plasticizers and burning-control materials, such as phenylethyleneurethane, nitrodiphenylamine, centralit and the like.

Any conventional appropriate thermoplastic material may be used for the foil 7 if a separate foil is to be used. In the alternative, metallic foils such as aluminum foil may be used.

Any suitable known cementing, bonding or gluing material may be used for the layer 4 such as, for instance, a polyurethane glue, conventional double-basic cast powder mixtures, solvent glues with pre-mixed solid propellant fuels and the like.

As pointed out above, diffusion or migration of the component parts of the solid fuels between stages 1 and 5 can be prevented if the same base compositions are used, for example, if both use conventional known nitroglycerine base compositions. Thus, the term similar base compositions is to be understood herein to refere to such powders or propellant fuels in which the proportions of the basic ingredients are so chosen that no diffusion or migration of these materials takes place from one type of powder into the other. What is meant by similar base compositions will also become readily apparent from the following typical examples mentioned only for non-illustrative purposes, in which the nitroglycerine content and also the phenylethyleneurethane content are so proportioned that no diffusion or migration of these materials takes place from one type of powder to the other. In the following typical examples, this is the case as in both powders the nitroglycerine and the plasticizer contents are substantially the same even though the proportions of the conventional burning control materials are different.

*Typical example for the propellant fuel of the starting stage 1*

| | Percent |
|---|---|
| Nitroglycerine | 37.2 |
| Nitrocellulose | 50.8 |
| Nitrodiphenylamine | 2.0 |
| Phenylethyleneurethane | 4.0 |
| Conventional burning control material | 5.7 |
| Wax | 0.3 |

*Typical example for the propellant fuel of the operating stage 5*

| | Percent |
|---|---|
| Nitroglycerine | 37.2 |
| Nitrocellulose | 50.8 |
| Centralit | 5.7 |
| Phenylethyleneurethane | 4.0 |
| Conventional burning control material | 2.0 |
| Wax | 0.3 |

Insofar as the term "jamming range" is concerned, mentioned in col. 1, line 35 herein, it is noted that the term "jamming" refers to the surface ratio of burning surface to nozzle cross section. Double-basic powders ordinarily only burn when this ratio lies between 200:1 to 500:1. This range is normally referred to as "jamming range." In the range below 200:1, burning instabilities normally occur whereas in the range about 500:1, the burning pressure increases rapidly and becomes uncontrollable.

FIGURE 2 illustrates an embodiment of the present invention wherein the bonding surfaces adjacent the bonding layer 4 each define a substantially flat plane generally perpendicular to the longitudinal axis of the propellant charge and the free end burning surface 2 is substantially spherically shaped. Otherwise, the elements are identical to the correspondingly numbered elements in the embodiment of FIGURE 1.

While I have shown and described one embodiment in accordance with the present invention, it is understood that the same is not limited thereto but is susceptible of numerous changes and modifications as are known to a person skilled in the art; and I, therefore, do not wish to be limited to the details shown and described herein but intend to cover all such changes and modifications as are encompassed by the scope of the appended claims.

I claim:
1. A solid fuel end burner propellant charge for rocket engines having an axis extending in the direction of burning, comprising: a first solid block of propellant fuel that is void of any axial through passageways, constituting a starter stage; said first block having a free burning end surface for ignition; said first block having an opposite first bonding end surface axially spaced a substantial distance throughout its entire extent from said free burning end surface; a second solid block of propellant fuel having a substantially slower burning characteristic for sustained flight and a second bonding end surface corresponding in shape to said bonding end surface substantially throughout their extent; means holding said bonding end surfaces together throughout their extent; said first bonding end surface having surface portions axially spaced from corresponding axially aligned surface portions of said free burning end surface at substantially different axial distances than the axial distances between the remaining surface portions of said first bonding surface and the axially aligned corresponding surface portions of said free end surface, to constitute means for transmitting the ignition from said first block to said second block over a predetermined substantial transition period of time corresponding to the time between the ignition of the bonding surface portion with the smallest axial spacing from its corresponding axially aligned free end surface portion and the ignition of the bonding surface portion with the greatest axial spacing from its corresponding axially aligned free end surface portion; said first solid block of propellant fuel constituting starter stage means for pro- ducing a starter burning period of time burning substantially only portions of said first block that is of substantially greater duration than said transition period; said second solid block of propellant fuel constituting sustained flight stage means for producing a sustained flight burning period of time burning substantially only portions of said second block that is of substantially greater duration than said transition period; and each of said free bonding and free end surfaces being axially symmetrical.

2. The device of claim 1, wherein said bonding surfaces are mirror images of each other and spherically shaped; said free end surface defines a substantially flat plane generally perpendicular to the axis.

3. The device of claim 2, wherein said first and second blocks consist essentially of propellant powder having the same base composition and different burning accelerators.

4. The device of claim 1, wherein said first and second blocks consist essentially of propellant powder having the same base composition and different burning accelerators.

5. The device of claim 1, wherein said means for transmitting the ignition determines said predetermined substantial period of time within the range of 0.2 to 0.4 second.

6. The device of claim 1, wherein said second block is void of any axially extending through passageways.

7. The device of claim 1, including an insulation wall means for surrounding said first and second block on all sides except said free burning end surfaces.

8. The device of claim 1, including separate fusion means tightly bonding said bonding surfaces together.

9. A solid fuel end burner propellant charge for rocket engines having an axis extending in the direction of burning, comprising: a first solid block of propellant fuel that is void of any axial through passageways constituting a starter stage; said first block having a free burning end surface for ignition; said first block having an axially opposite first bonding end surface; a second solid block of propellant fuel having a substantially slower burning characteristic, and a second bonding end surface corresponding in shape to said first bonding end surface substantially throughout their extent; means holding said bonding end surfaces together throughout their extent; said first bonding end surface having surface portions axially spaced from corresponding axially aligned surface portions of said free burning end surface at substantially different axial distances than the axial distances between the remaining surface portions of said first bonding surface and the axially aligned corresponding surface portions of said free end surface, to constitute means for transmitting the ignition from said first block to said second block over a predetermined substantial period of time corresponding to the time between the ignition of the bonding surface portion with the smallest axial spacing from its corresponding axially aligned free end surface portion and the ignition of the bonding surface portion with the greatest axial spacing from its corresponding axially aligned free end surface portion; an impervious foil consisting essentially of thermoplastic material interposed between said bonding end surfaces.

10. The device of claim 9, wherein each of said bonding and free end surfaces is axially symmetrical; said bonding surfaces are mirror images of each other and spherically shaped; said free end surface defines a substantially flat plane generally perpendicular to the axis; said first and second blocks consist essentially of propellant powder having the same base composition and different burning accelerators.

11. The device of claim 10, wherein said means for transmitting the ignition determines said predetermined substantial period of time within the range of 0.2 to 0.4 second.

12. The device of claim 11, wherein said second block is void of any axially extending through passageways.

13. The device of claim 12, including an insulation wall means for surrounding said first and second block on all sides except said free burning end surfaces.

14. The device of claim 13, including separate fusion means tightly bonding said bonding surfaces together.

15. A solid fuel end burner propellant charge for rocket engines having an axis extending in the direction of burning, comprising: a first solid block of propellant fuel that is void of any axial through passageways constituting a starter stage; said first block having a free burning end surface for ignition; said first block having an axially opposite first bonding end surface; a second solid block of propellant fuel having a substantially slower burning characteristic and a second bonding end surface corresponding in shape to said first bonding end surface substantially throughout their extent; means holding said bonding end surfaces together throughout their extent; said first bonding end surface having surface portions axially spaced from corresponding axially aligned surface portions of said free burning end surface at substantially different axial distances than the axial distances between the remaining surface portions of said first bonding surface and the axially aligned corresponding surface portions of said free end surface, to constitute means for transmitting the ignition from said first block to said second block over a predetermined substantial period of time corresponding to the time between the ignition of the bonding surface portion with the smallest axial spacing from its corresponding axially aligned free end surface portion and the ignition of the bonding surface portion with the greatest axial spacing from its corresponding axially aligned free end surface portion, said bonding surfaces each defining a substantially flat plane generally perpendicular to the axis, and said free end surface being substantially spherically shaped.

References Cited

UNITED STATES PATENTS

| | | | |
|---|---|---|---|
| 1,074,809 | 10/1913 | Newton | 102—98 |
| 1,920,075 | 7/1933 | Haenichen | 102—98 X |
| 3,104,523 | 9/1963 | O'Donnell | 60—35.6 |
| 3,165,060 | 1/1965 | Braun et al. | 102—98 |
| 3,285,012 | 12/1966 | Larue | 102—98 X |

OTHER REFERENCES

ARS Journal, vol. 29, No. 8, August 1959, pages 598–600.

BENJAMIN A. BORCHELT, *Primary Examiner.*

ROBERT F. STAHL, *Examiner.*

UNITED STATES PATENT OFFICE

CERTIFICATE OF CORRECTION

Patent No. 3,352,243                        November 14, 1967

Heinz Dilchert

It is hereby certified that error appears in the above numbered patent requiring correction and that the said Letters Patent should read as corrected below.

In the heading to the printed specification, between lines 5 and 6 insert the following:

Claims priority, application Germany, July 15, 1964, D 44,947.

Signed and sealed this 3rd day of December 1968.

(SEAL)
Attest:

Edward M. Fletcher, Jr.
Attesting Officer

EDWARD J. BRENNER
Commissioner of Patents